United States Patent [19]
Umeda

[11] Patent Number: 5,467,943
[45] Date of Patent: Nov. 21, 1995

[54] WINDOW STRUCTURE EQUIPPED ON SIDE WALLS OF A CABIN IN THE BODY OF AN AIRPLANE

[75] Inventor: Katsuhiko Umeda, Tokyo, Japan

[73] Assignee: Jamco Corporation, Tokyo, Japan

[21] Appl. No.: 150,819

[22] Filed: Nov. 12, 1993

[30] Foreign Application Priority Data

Aug. 19, 1993 [JP] Japan ...................................... 5-204878

[51] Int. Cl.⁶ ................................ B64C 1/14; B63B 19/02
[52] U.S. Cl. ........................ 244/129.3; 244/121; 244/133; 52/786.12; 114/173
[58] Field of Search ................................ 244/121, 129.3, 244/129.4, 133; 52/204.593, 204.6, 788, 171; 296/145; D6/575; 49/501; 114/173, 178, 201

[56] References Cited

U.S. PATENT DOCUMENTS

| | | | |
|---|---|---|---|
| 1,661,581 | 3/1928 | Schriever et al. | 114/178 |
| 1,777,309 | 10/1930 | Hopkinson | 244/129.3 |
| 2,444,976 | 7/1948 | Brown | 244/129.3 |
| 2,464,826 | 3/1949 | Netter et al. | 244/129.3 |
| 2,511,168 | 6/1950 | Martin et al. | 244/129.3 |
| 2,784,926 | 3/1957 | Bonza et al. | 244/129.3 |
| 3,061,490 | 10/1962 | Ryan | 244/129.3 |
| 3,556,038 | 1/1971 | Wolfe | 114/173 |
| 3,691,686 | 9/1972 | Donegan | 49/56 |
| 3,721,407 | 3/1973 | Clarke | 244/121 |
| 3,801,418 | 4/1974 | Cornelis et al. | 52/171.1 |
| 3,906,669 | 9/1975 | Vorguitch | 244/129.3 |
| 4,081,581 | 3/1978 | Littell, Jr. | 244/129.3 |
| 4,812,359 | 3/1989 | Hall | 244/121 |
| 4,877,658 | 10/1989 | Calhoon | 244/129.3 |
| 4,963,206 | 10/1990 | Shacklette et al. | 52/789 |
| 5,099,621 | 3/1992 | Schacklette et al. | 52/788 |

Primary Examiner—Andres Kashnikow
Assistant Examiner—Virna Lissi Mojica
Attorney, Agent, or Firm—Armstrong, Westerman, Hattori, McLeland & Naughton

[57] ABSTRACT

In a window structure equipped on the side walls of a cabin in the body of an airplane, a transparent board is mounted on the outer portion for sealing the pressure inside the cabin. A dust cover is mounted in the inner side of the transparent board sealing the pressure, and a shade 80 which is able to take an up and down movement is mounted on the cabin side of the dust cover for blocking outer incident light. The dust cover comprises of a transparent resin board and a non-elastic film stuck on the surface of the transparent resin board facing the shade. The acrylic resin used as the material of the transparent resin board expands by absorbing the water in the air, but by the operation of the non-elastic film, the dust cover bends toward the outer direction F of the body, and will not interfere with the locus $L_1$ of the up and down movement of the shade.

4 Claims, 7 Drawing Sheets

WINDOW STRUCTURE EQUIPPED ON SIDE WALLS OF A CABIN IN THE BODY OF AN AIRPLANE

BACKGROUND OF THE INVENTION

1. Field of the Invention

The present invention relates to window structure equipped on the side walls of a cabin in the body of an airplane.

2. Description of the Prior Art

Figure 8:
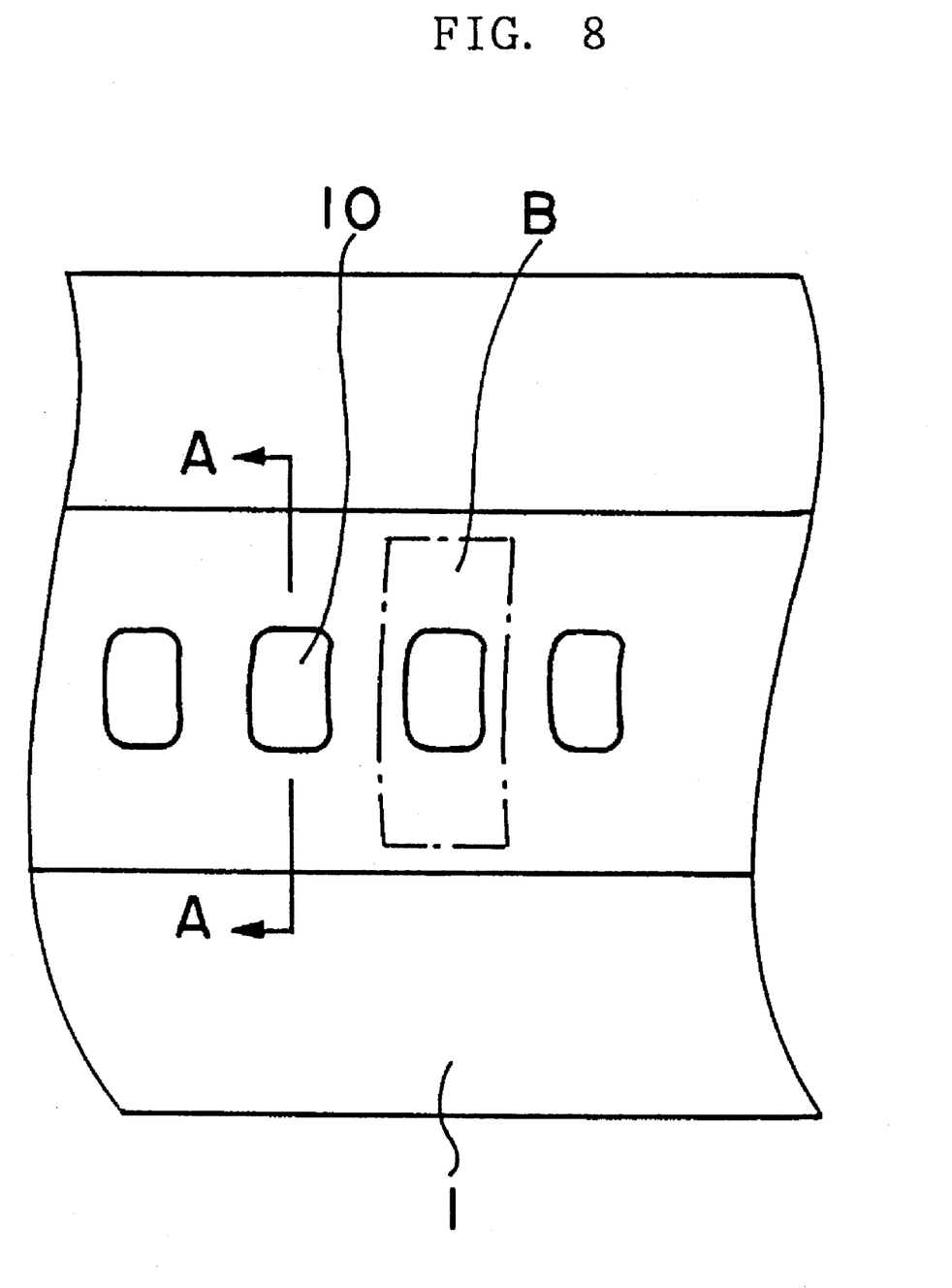
FIG. 8 is an external view of the cabin side surface of the body of an airplane.
Figure 9:
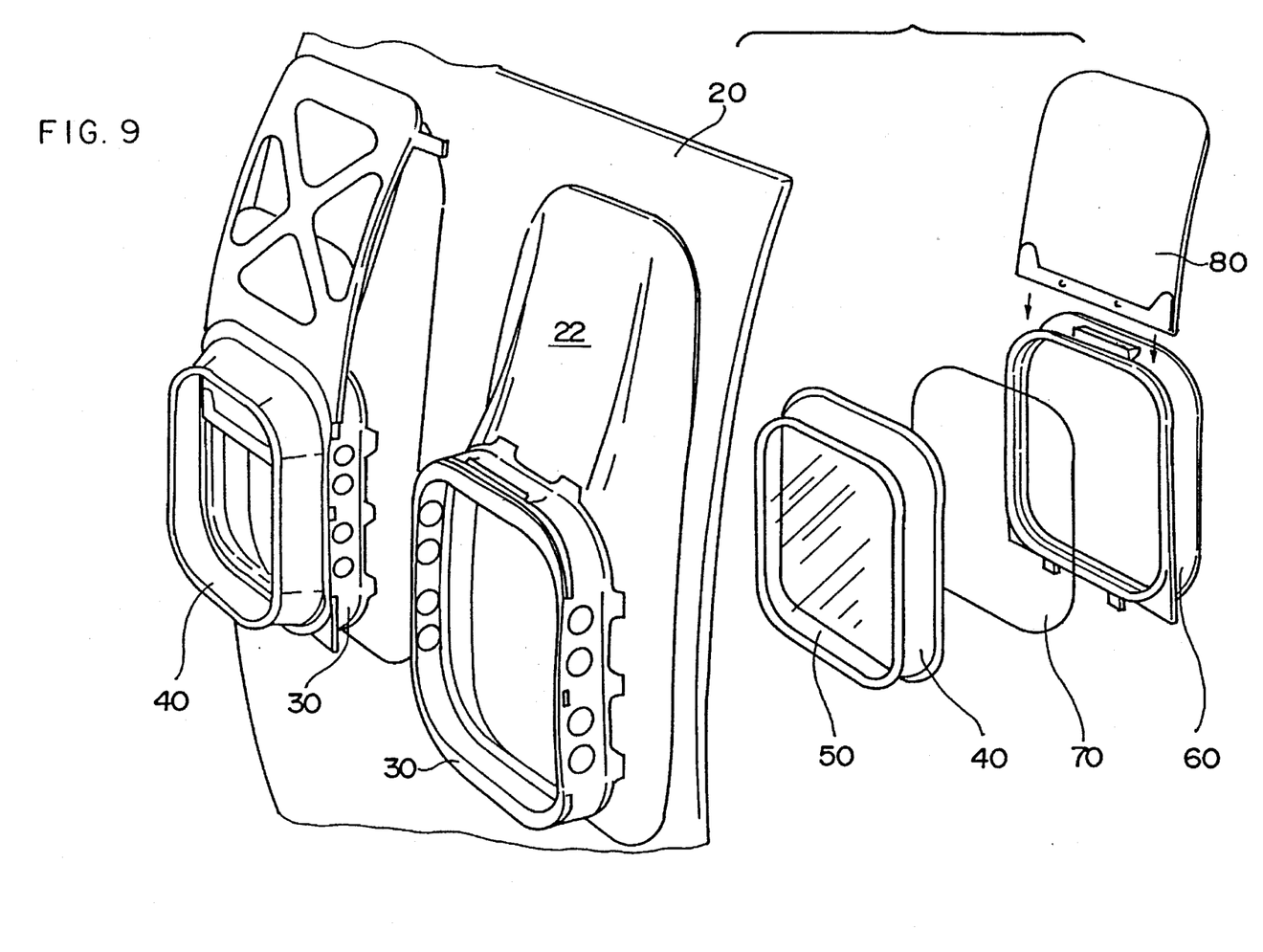
FIG. 9 is an explanatory view showing the component of the section B of FIG. 8.

FIG. 8 shows a part of the body of an airplane, and FIG. 9 shows the structure near portion B of FIG. 8.

Windows 10 are mounted on the side walls of the cabin of the body 1 of an airplane.

FIG. 9 shows the structure of the window portion on the side walls of the cabin. A projection portion 22 which projects in the outer direction from the airplane body is formed on the inner panel 20 mounted on the inside of the body, and a window frame 30 is fixed on the edge of the projection portion 22. An outer window frame 40 is mounted on the outer side of the window frame 30. A transparent board 50 is mounted on the outer window frame 40. The transparent board 50 has a structure where two plastic boards having high strength are piled up, so it is strong enough to bare the pressure inside the cabin.

A dust cover 70 for preventing dust and the like from entering is mounted on the inner window frame 60 which is mounted on the cabin side of the window frame 30, and a shade 80 is set slidably in up-and-down direction in the inner side of the dust cover. The passenger can move the shade 80 up and down in order to control the amount of incident light from outside.

OBJECT OF THE INVENTION

Dust cover 70 is preferably made of a light and strong material to achieve its aim, and an acrylic resin is used at present.

Acrylic resin has high transparency and its feature is good for a window material of airplanes, but it also has a character to absorb water easily.

Figure 10:
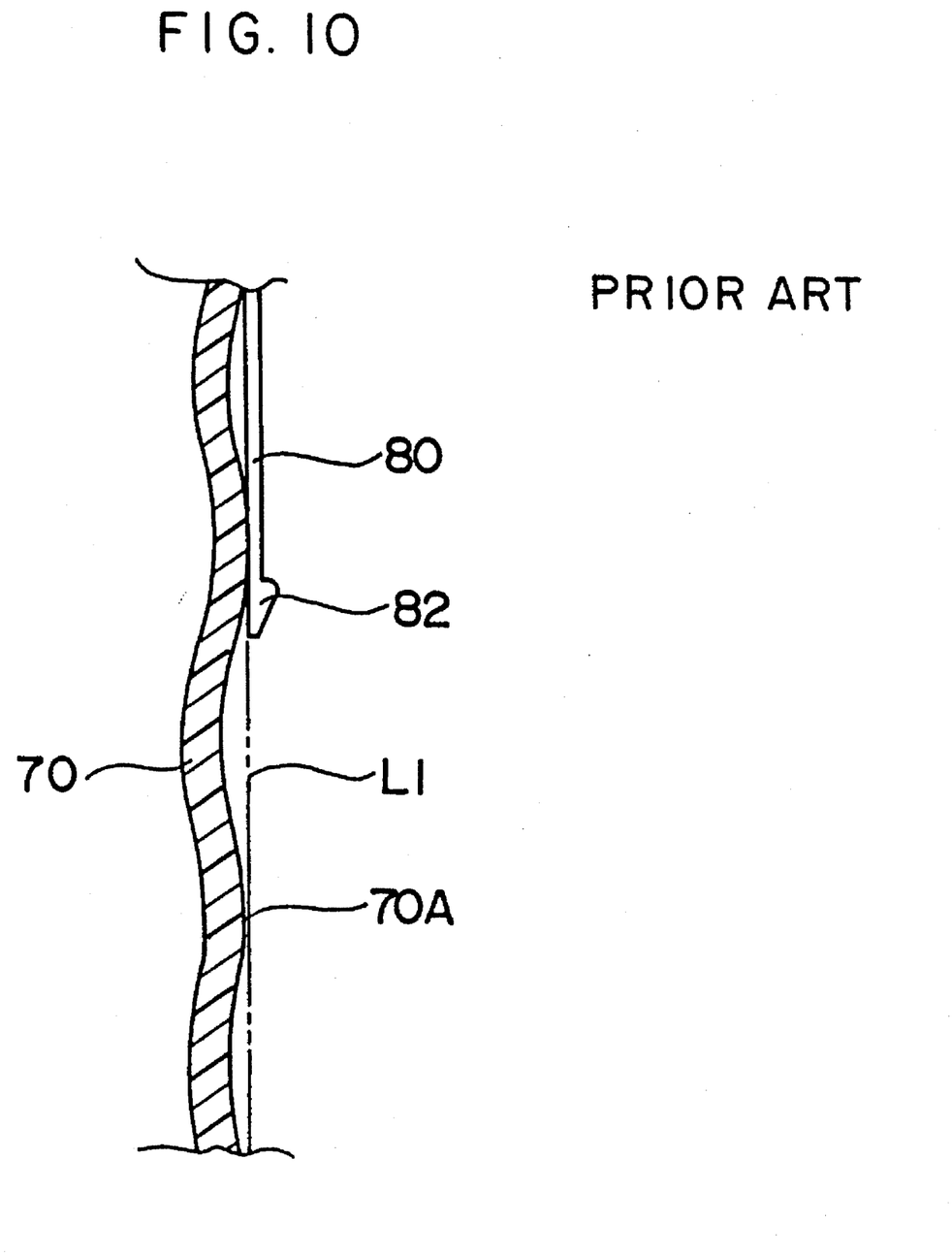
FIG. 10 is a cross sectional view of the dust cover portion of the window structure of the prior art.

FIG. 10 shows a state where the dust cover 70 made of acrylic resin absorbed water and expanded, and transformed to a wave shape.

Shade 80 is made of hard resin material and the like, having a handle portion 82 on the bottom end portion, and the passengers take hold of this handle portion 82 to move the shade up and down along a locus $L_1$.

When the projecting portion 70A of the transformed dust cover absorbing water and projecting to the inner cabin side interfere with the locus $L_1$ of the up and down movement of the shade 80, an excoriation will occur on the surface of the dust cover 70 by the shade 80.

When an excoriation is formed on the dust cover 70, outer light will perform a diffused reflection, lowering the transparency. The appearance will also be damaged, so they must be changed.

The object of the present invention is to offer a window structure equipped on side walls of a cabin in an airplane which solves the above inconveniences.

SUMMARY OF THE INVENTION

A window structure equipped on the side walls of a cabin in the body of an airplane comprises of a window frame mounted on the body, a transparent board supported inside the body member of the window frame to seal the pressure inside the cabin, a dust cover mounted in a position closer to the cabin than the transparent board, and a shade which is able to take an up and down movement mounted close to the surface of the dust cover facing the cabin for blocking light, wherein the dust cover comprises of a transparent resin board and a non-elastic transparent film stuck on the surface of the transparent resin board facing the shade.

Further, a means for forming a window structure dust cover equipped on the side walls of a cabin in the body of an airplane is provided. It comprises of a transparent resin board, a non-elastic transparent film stuck on the surface of the transparent resin board facing the shade, and a polarizing film mounted inbetween the transparent resin board and the transparent film.

The transparent resin board forming the dust cover absorbs water and expands, but a non-elastic film is stuck onto it so that the board bends toward the direction forming a space between the shade, and will not interfere with the locus of the shade moving up and down.

DETAILED DESCRIPTION OF THE PREFERRED EMBODIMENT

Figure 1:
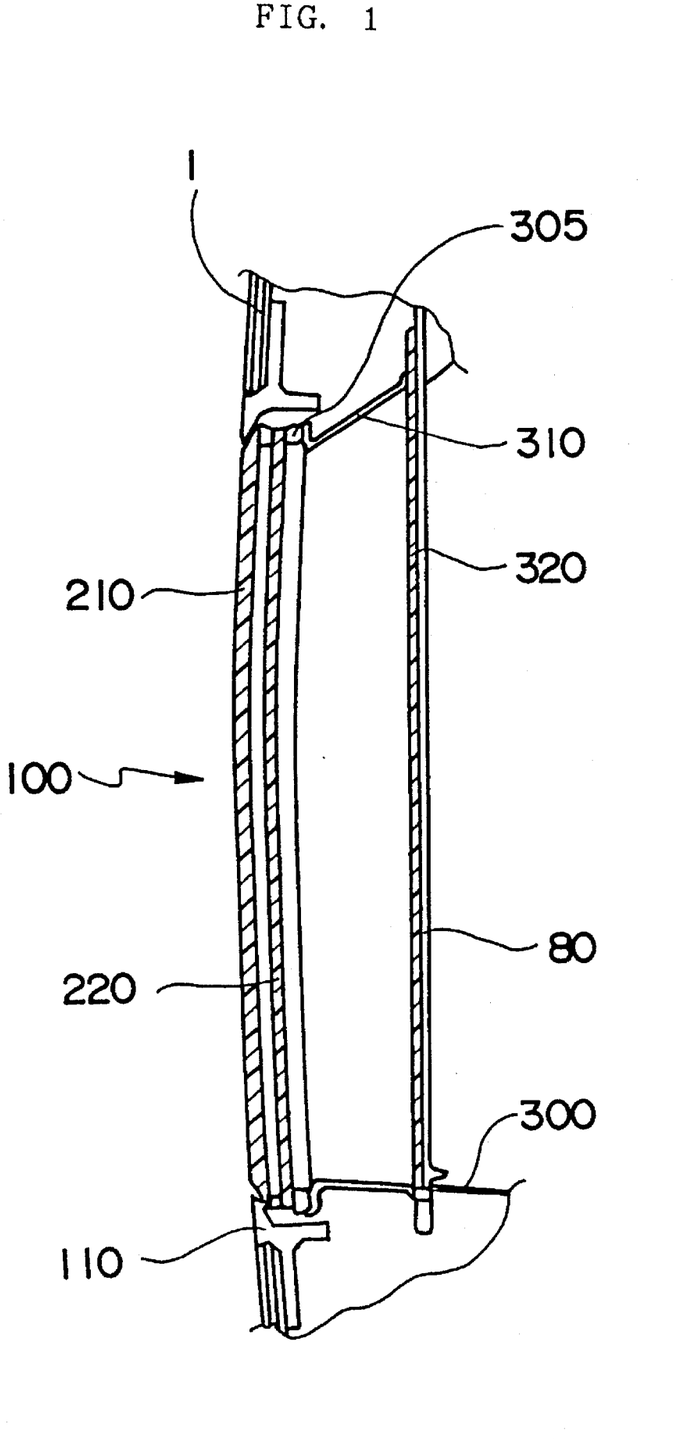
FIG. 1 is a cross sectional view of the window structure of the cabin side of the airplane body of the present invention.

FIG. 1 is across sectional view of the window structure of the present invention.

The window structure shown as a whole by the number 100 has a window frame 110 mounted on the window opening portion of the body 1 of an airplane. On the window frame 110, a first transparent board 210 is mounted in the outer side and a second transparent board 220 is mounted in the inner side of the first transparent board.

Figure 2:
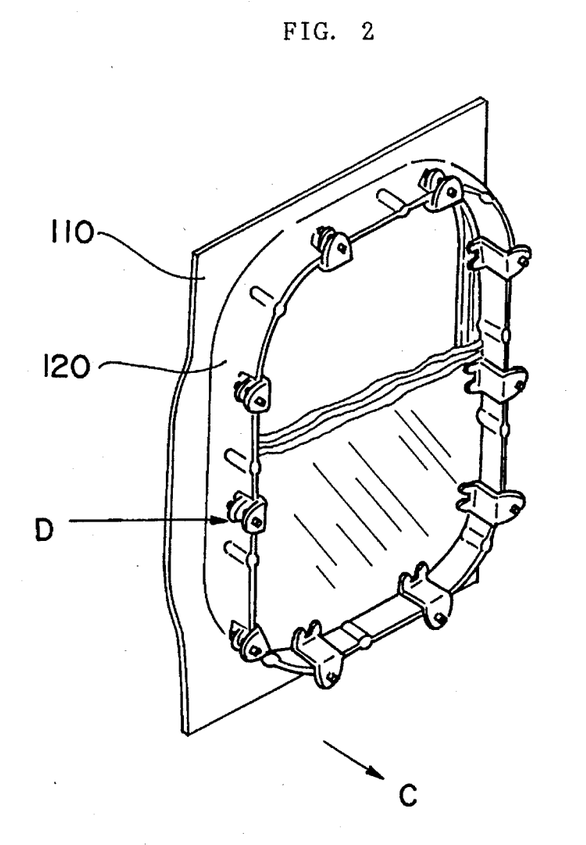
FIG. 2 is a schematic view of the window frame.
Figure 3:
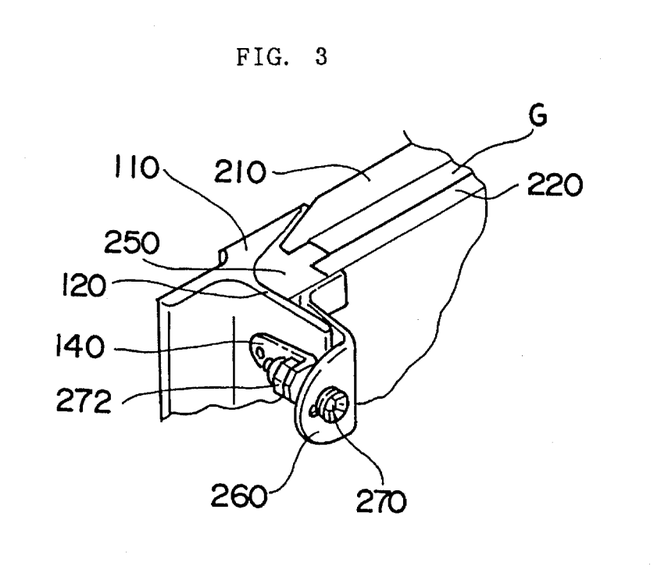
FIG. 3 is an enlarged drawing of section D of FIG. 2.

FIG. 2 shows the detail of the mounting structure of the window frame 110 and the first and second transparent boards 210, 220, and FIG. 3 is a magnified drawing of section D of FIG. 2.

The window frame 110 has a body member 120 which extends inwardly to the body of the airplane, and a suitable reinforcement member 130 is mounted on the outer side of the body member 120.

As is shown in FIG. 3, the first transparent board 210 and the second transparent board 220 is supported by a spacer ring 250 so that they have a space G inbetween. A fixture 140 is fixed onto the body member 120 of the window frame, and the spacer ring 250 is fixed against the fixture 140 by a spring clip 260 utilizing a bolt 270 and a nut 272. Ten spring clips 260 are mounted on the surrounding of the body member 120 of the window frame. By the operation of the spring clip 260, the spacer ring 250 for supporting the transparent boards 210, 220 will securely be fixed to the window frame 110.

Figure 4:
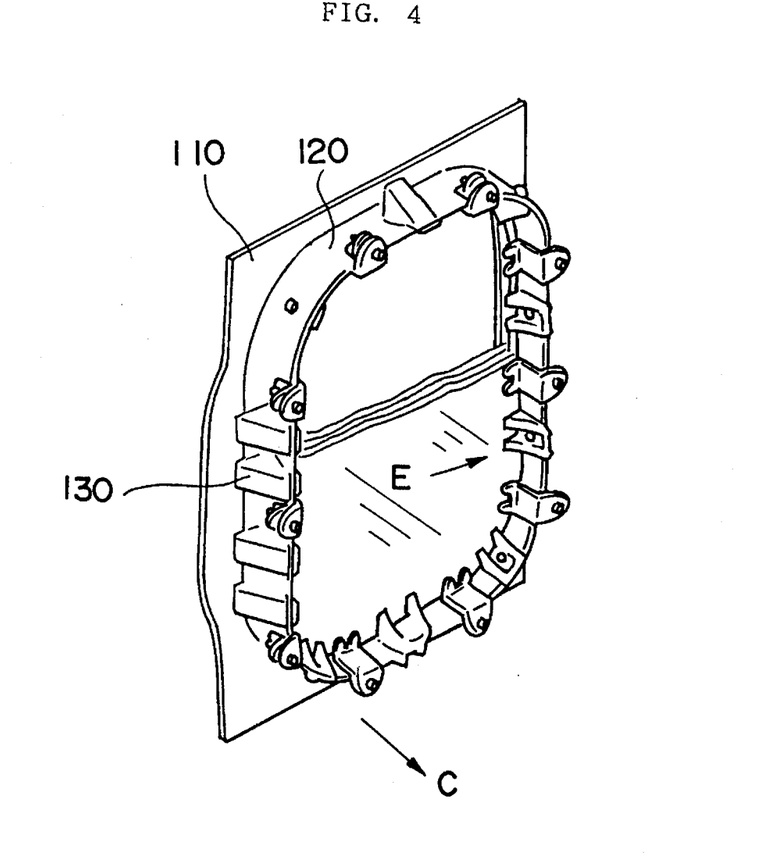
FIG. 4 is a schematic view of the window frame.
Figure 5:
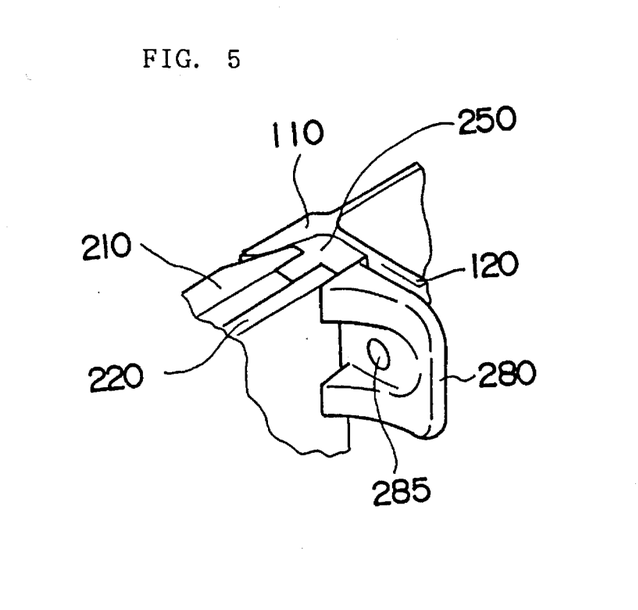
FIG. 5 is an enlarged drawing of section E of FIG. 4.

FIG. 4 shows the means to fix the second transparent board 220 to the spacer ring 250, and FIG. 5 is an enlarged drawing of the section E of FIG. 4.

A retainer member 280 is pressed onto the inner fringe portion of the second transparent board 220 whose outer surrounding fringe is supported by the spacer ring 250, and the retainer member 280 is fastened onto the body member 120 of the window frame by a bis 285. A serration could be formed in the connecting surface of the retainer member 280 and the body member 120, for example, to avoid the connecting surface from being loose.

As described above, the first transparent board 210 and the second transparent board 220 is fixed firmly to the window frame 110 supported by the spacer ring. The first transparent board 210 or the second transparent board 220 has enough strength to endure the pressure against the cabin alone, but by placing two boards with a space inbetween, the window portion could be sealed completely.

An inner window frame 310 is mounted on the inner side of the second transparent board 220 mounted on the window frame 110 through a seal 305. The inner window frame 310 will be mounted onto the interior member 300 of the cabin, and a dust cover 320 and a shade 80 will also be mounted thereto.

Figure 6:
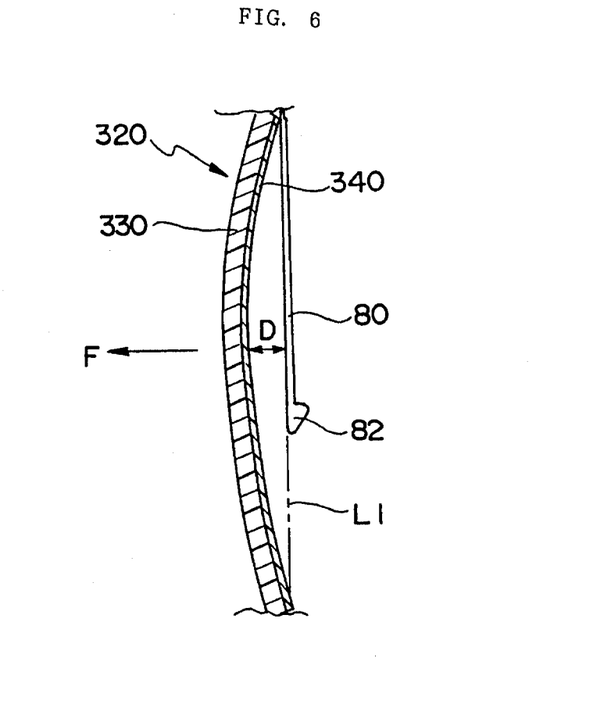
FIG. 6 is a cross sectional view of the dust cover portion of the window structure of the present invention.

FIG. 6 is a cross sectional view showing the enlarged drawing of the structure of the dust cover 320 mounted on the nearest side of the cabin, and the shade 80.

The dust cover 320 is comprised of a transparent board body 330 made of acrylic resin and having a thickness of approximately 1.6 mm, and a transparent film 340 stuck on the inner cabin side of the acrylic board 330 having a thickness of approximately 0.25 mm and having no elasticity. A transparent adhesive is used as the adhesive.

The acrylic resin board 330 expands by absorbing the water in the air or dew. When such expansion happens, the acrylic resin board 330 bends toward the outer direction of the airplane body shown by arrow F because the transparent film 340 having no elasticity is stuck onto it.

Therefore, a space D will be formed between the locus $L_1$ of the up and down movement of the shade 80 mounted on the cabin side of the dust cover 320 and the dust cover 320, and they will not interfere with one another.

So, the operation of the shade 80 will be smooth, and the damage of the dust cover 320 will be prevented.

Figure 7:
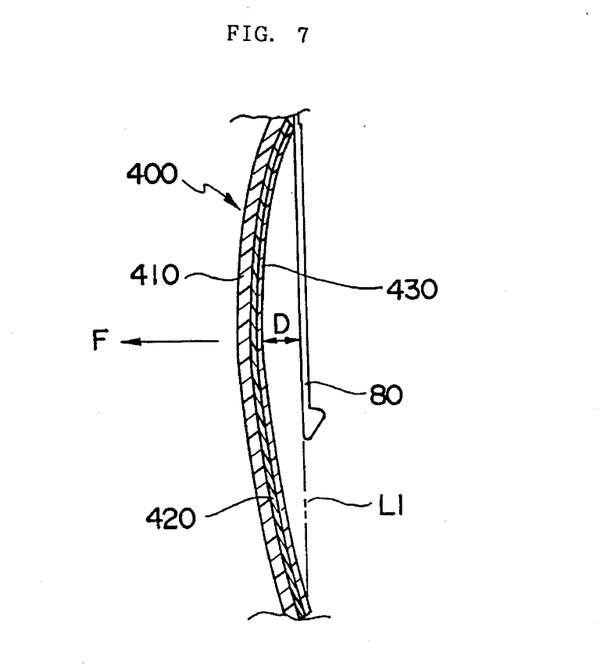
FIG. 7 is a cross sectional view of the dust cover portion of the window structure of the present invention.

FIG. 7 is an explanatory view of another embodiment of the dust cover.

This dust cover 400 is comprised of an acrylic resin board 410 having a thickness of approximately 1.6 mm, a polarizing film 420 formed on the inner cabin side of the acrylic resin board surface having a thickness of approximately 0.1 mm, and a non-elastic film 430 stuck on the surface of the polarizing film 420 having a thickness of approximately 0.25 mm. This dust cover 400 also bends toward the outer direction of the airplane body shown by arrow F when the acrylic resin board 410 absorbs water and expands by the existence of a non-elastic film 430, and a space D will be formed between the shade 80.

Therefore, the dust cover 400 and the shade 800 will not interfere with each other, and the smooth up and down movement of the shade 80 will be accomplished.

By placing a polarizing film in the dust cover 400, the glaringness of outer light could be reduced, and the picture projected inside the cabin by a projector and the like could be easier to watch.

The window structure equipped on the side walls of the cabin in an airplane body of the present invention forms the dust cover mounted on the inner side of the transparent board set in the outermost side for sealing the pressure of the cabin by a transparent resin board by a transparent resin board and a non-elastic film stuck on the surface of the transparent resin board facing the shade. An acrylic resin which is light, having high strength and high transparency, is suitable for the material of the transparent resin board. However, acrylic resin has a character to expand by absorbing water. The present invention uses this character positively, and forms the dust cover so that it bends in the direction going away from the shade forming a space inbetween by sticking a non-elastic film on the surface of the acrylic resin board facing the shade.

By the structure described above, the shade will not interfere with the dust cover when the passenger moves the shade up and down to control the amount of outer incident light, and the dust cover could be free from damage by excoriation and the like.

Further, in a dust cover structure where a polarizing film is mounted inbetween the transparent resin board and the non-elastic film, the outer sunlight and the like is introduced into the airplane in a polarized state, so the visibility of the image projected on the screen by a projector and the like could be improved.

What is claimed is:

1. A window structure equipped on the side walls of a cabin in the body of an airplane comprising:

a window frame mounted on the body;

a window frame body member;

a transparent board supported inside said body member of the window frame to seal the pressure inside the cabin;

a dust cover mounted in a position closer to the cabin than the transparent board; and a shade which is able to take an up and down movement mounted close to the surface of the dust cover facing the cabin for blocking light;

wherein the dust cover comprises of:

a transparent resin board; and a non-elastic transparent film stuck on the surface of the transparent resin board facing the shade.

2. A window structure equipped on the side walls of a cabin in the body of an airplane comprising:

a window frame mounted on the body;

a window frame body member;

a transparent board supported inside said body member of the window frame to seal the pressure inside the cabin;

a dust cover mounted in a position closer to the cabin than the transparent board; and a shade which is able to take an up and down movement mounted close to the surface of the dust cover facing the cabin for blocking light;

wherein the dust cover comprises of:

a transparent resin board;

a non-elastic transparent film stuck on the surface of the transparent resin board facing the shade; and a polarizing film mounted inbetween the transparent resin board and the non-elastic transparent film.

3. A window structure equipped on the side walls of a cabin in the body of an airplane claimed in claim 1 or claim 2, wherein;

the transparent resin board for sealing the pressure inside the cabin is a double structured transparent board made of acrylic resin.

4. A window structure equipped on the side walls of a cabin in the body of an airplane claimed in claim 1 or claim 2, wherein;

the transparent resin board forming the dust cover is a transparent board made of acrylic resin.

* * * * *